(12) United States Patent
Eberts et al.

(10) Patent No.: US 10,759,546 B2
(45) Date of Patent: Sep. 1, 2020

(54) TRANSIENT VOLTAGE SUPPRESSION PROTECTION CIRCUIT INCLUDING BUILT IN TESTING AND ENABLE-DISABLE FUNCTIONALITY

(71) Applicant: Hamilton Sundstrand Corporation, Charlotte, NC (US)

(72) Inventors: Christopher Charles Eberts, Chandler, AZ (US); Gary L. Hess, Enfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 458 days.

(21) Appl. No.: 15/684,017

(22) Filed: Aug. 23, 2017

(65) Prior Publication Data

US 2019/0061974 A1    Feb. 28, 2019

(51) Int. Cl.
| | |
|---|---|
| *H02H 9/00* | (2006.01) |
| *B64D 45/02* | (2006.01) |
| *H02H 9/04* | (2006.01) |
| *H02H 1/04* | (2006.01) |

(52) U.S. Cl.
CPC .............. *B64D 45/02* (2013.01); *H02H 1/04* (2013.01); *H02H 9/041* (2013.01); *H02H 9/043* (2013.01)

(58) Field of Classification Search
None
See application file for complete search history.

(56) References Cited

U.S. PATENT DOCUMENTS

| | | | |
|---|---|---|---|
| 6,084,464 A * | 7/2000 | Lin ..................... | H01L 27/0629 257/E23.146 |
| 8,598,899 B2 | 12/2013 | Hess | |
| 8,649,149 B1 | 2/2014 | Smith et al. | |
| 8,837,099 B2 * | 9/2014 | Coln ................... | H01L 27/0255 361/56 |
| 9,383,405 B2 | 7/2016 | Hess et al. | |
| 9,466,976 B2 | 10/2016 | Gray | |
| 9,819,177 B2 * | 11/2017 | Du ...................... | H02H 11/002 |
| 2016/0097803 A1 | 4/2016 | Quigley et al. | |
| 2016/0322807 A1 | 11/2016 | Milkie | |

FOREIGN PATENT DOCUMENTS

WO    2017060217    4/2017

OTHER PUBLICATIONS

European Search report for application No. 18189695.2 dated Jan. 11, 2019.

* cited by examiner

*Primary Examiner* — Stephen W Jackson
(74) *Attorney, Agent, or Firm* — Carlson, Gaskey & Olds, P.C.

(57) ABSTRACT

An aircraft electrical system includes a controller system having a self-testing system configured to test an operability of a transient voltage suppression device. A single line communication bus is connected to a communications output of the controller. A first lightning protection device including the transient voltage suppression device is configured to protect the controller from transient voltages. An enable/disable circuit comprising a normally closed switch connects a low side of the lightning protection device to a neutral.

16 Claims, 3 Drawing Sheets

TRANSIENT VOLTAGE SUPPRESSION PROTECTION CIRCUIT INCLUDING BUILT IN TESTING AND ENABLE-DISABLE FUNCTIONALITY

TECHNICAL FIELD

The present disclosure relates generally to lightning protection circuits for aircraft, and more specifically to a lightning protection circuit including a transient voltage suppression element having a built in enable-disable functionality.

BACKGROUND OF THE INVENTION

Modern aircraft typically utilize multiple on-board electrical systems and controls to ensure proper operation of the aircraft. In some examples, one or more of the on-board electrical systems communicate with a pilot, or the cockpit in general, via a single line communication bus. Such systems are referred to herein as single line communication systems.

One environmental risk aircraft are exposed to during flight is the potential of a lightning strike hitting the aircraft. When lightning strikes an aircraft, a surge of electricity passes through the aircraft and any unprotected electrical systems onboard the aircraft. The surge can overload unprotected electrical systems and damage or destroy the unprotected electrical system. This surge of electricity is referred to as a lightning transient surge. In order to protect against these lightning transient surges, aircraft include lightning protection circuits connected to one or more on board electrical systems. The lightning protection circuits shunt the lightning transient surge away from the protected electrical system, and to a neutral power line.

Some existing lightning protection circuits utilize a transient voltage suppression device as a clamping portion of the transient surge protection. Further, in some cases the transient voltage suppression device can enter a short circuit failure mode. While in the short circuit failure mode, the transient voltage suppression device directly connects the single line communication bus to a neutral point causing the communication bus to be unable to communicate with the cockpit. As the single line communication bus cannot communicate with the cockpit, each of the sensors, controllers, and other aircraft components that rely on the communication bus to transmit signals to the cockpit likewise cannot communicate with the cockpit.

In existing single communication line systems, the cockpit is unable to determine whether a communication interruption is due to a failed transient voltage suppression device or a more serious failure in one or more of the systems communicating over the single line communication bus. As a result, a failure of the transient voltage protection device is treated as a "worst case scenario" even when the aircraft components that communicate over the single line communication bus may otherwise be fully operational.

SUMMARY OF THE INVENTION

In one exemplary embodiment an aircraft electrical system includes a controller system including a self-testing system configured to test an operability of a transient voltage suppression device, a single line communication bus connected to a communications output of the controller, a first lightning protection device including the transient voltage suppression device and configured to protect the controller from transient voltages, and an enable/disable circuit comprising a normally closed switch connecting a low side of the lightning protection device to a neutral.

An exemplary method for operating an aircraft lightning protection circuit includes detecting a transient voltage suppression device failure using a controller system self-testing circuit, disconnecting the transient voltage suppression device using an enable/disable circuit, and communicating a state of at least one protected control system over a connected single line communication bus during a preset duration.

These and other features of the present invention can be best understood from the following specification and drawings, the following of which is a brief description.

DETAILED DESCRIPTION OF AN EMBODIMENT

Figure 1:
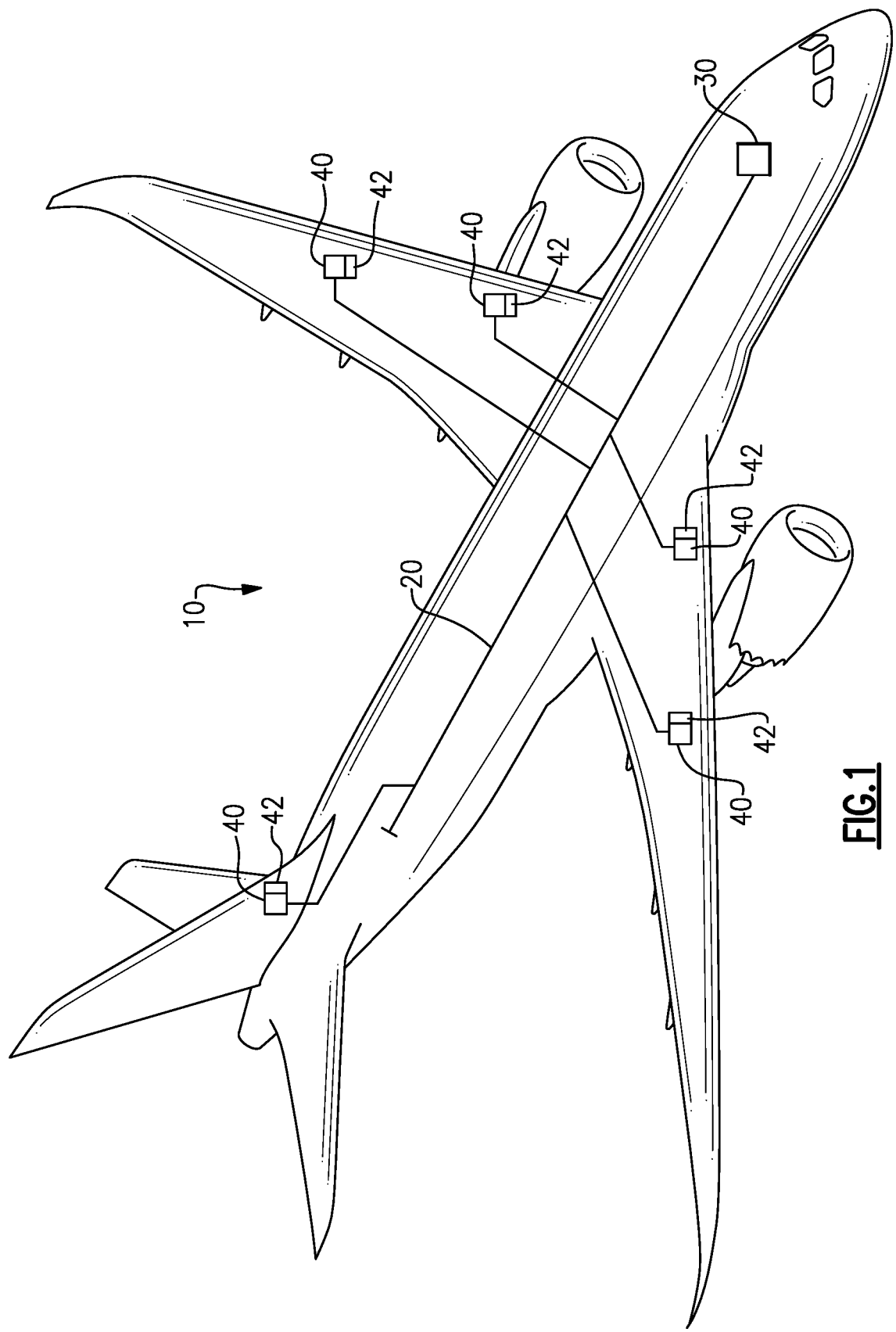
FIG. 1 schematically illustrates an aircraft including an electrical subsystem.

FIG. 1 schematically illustrates an aircraft 10 including a single line communication bus 20. The single line communication bus 20 is a single communication bus that communicates from one or more electrical control systems 40 throughout the aircraft 10 to a cockpit 30. In order to prevent transient voltage spikes, such as would be caused by a lightning strike, from damaging the control systems 40, the control systems 40 include lightning protection circuits 42. The lightning protection circuits 42 utilize a transient voltage suppression (TVS) device to limit the amount of voltage that can be dissipated through the control system 40 in the case of a high voltage event.

Figure 2:
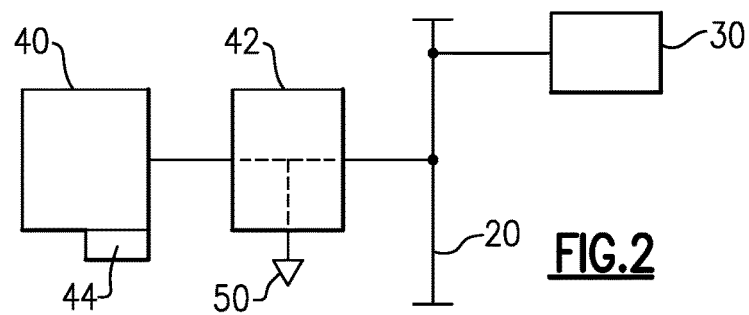
FIG. 2 schematically illustrates a lightning protection circuit for utilizing in the aircraft of FIG. 1.

The communication scheme illustrated in FIG. 1 is further illustrated in a simplified schematic form in FIG. 2. The aircraft component control system 40 outputs a communication signal to the single line communication bus 20 through a transient voltage protection device in the lightning protection circuit 42. When the transient voltage protection device in the lightning protection circuit 42 enters a failure mode causing a short circuit, the voltage through the transient voltage protection device in the lightning protection circuit 42, including the output signal from the aircraft control component, is redirected to a neutral 50. As a result of the redirection, the output signal is not provided to the single line communication bus 20, and the output from the control system 40 is not passed to the cockpit 30.

In some configurations, such as the illustrated configuration of FIG. 2, a transient voltage protection device in the lightning protection circuit 42 that is failed in a short condition will also provide a short circuit for the entire single line communication bus 20 to the neutral point, resulting in the single line communication bus 20 being unable to communicate any signals to the cockpit 30. When this occurs, the pilot is unable to determine if connected control systems 40 are still functional, or if the control systems 40 have ceased functioning. In the case of a flight critical control system 40, the pilot treats the ambiguity as if the flight critical control system 40 is not operational and responds accordingly.

In some cases, the control system 40 can further include a self-testing functionality that allows the control system 40 to determine when a connected transient voltage suppression device was failed. By way of example, the control system 40 can include an external sensor 44 that is configured to detect a voltage at the lightning protection circuit 42. The control system 40 can then utilize any known method to determine the functionality of the lightning protection device in the lightning protection circuit 42 based in whole, or in part, on the sensed voltage.

In exemplary configurations where either the transient voltage protection device in the lightning protection circuit 42 or the protected control system 40 includes a self-testing system, an enable/disable circuit can be further included, allowing the control system 40 to selectively disable or enable the lightning protection system 42 and temporarily allow communications to resume.

Figure 3:
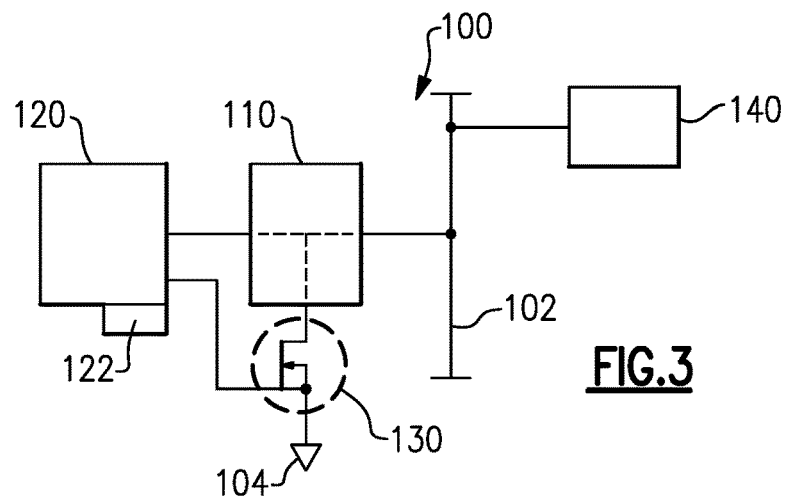
FIG. 3 schematically illustrates a lightning protection circuit including a selective enable/disable circuit.

FIG. 3 illustrates an exemplary single line communication bus 102 connection including a lightning protection device 110, a protected control system 120 and an enable/disable circuit 130. The protected control system 120 and the lightning protection device 110 are configured in the same manner as the control system 40 and the transient voltage protection device in the lightning protection circuit 42 of FIG. 2. A sensor 122 is included in the protected control system 120 in order to provide the self-testing capabilities described above.

Disposed between the lightning protection device 110 and a connection to a neutral 104 is an enable/disable circuit 130. In the exemplary embodiment, the enable/disable circuit 130 is a normally closed transistor. In some examples, the enable/disable circuit 130 is a low side circuit, meaning that the enable/disable circuit 130 is disposed between an output of the lightning protection device 110 and the neutral 104. In alternative configurations, the enable/disable circuit 130 could be positioned within the lightning protection device 110 and provide similar functionality.

While illustrated herein as a MOSFET transistor, one of skill in the art will understand that the enable/disable circuit 130 could include any normally closed switch configuration able to be controlled by the control system 120 and is not limited to a MOSFET transistor. As the enable/disable circuit 130 is normally closed, the lightning protection device 110 is connected to the neutral 104 during standard operations, and provides full transient protection.

Figure 4:
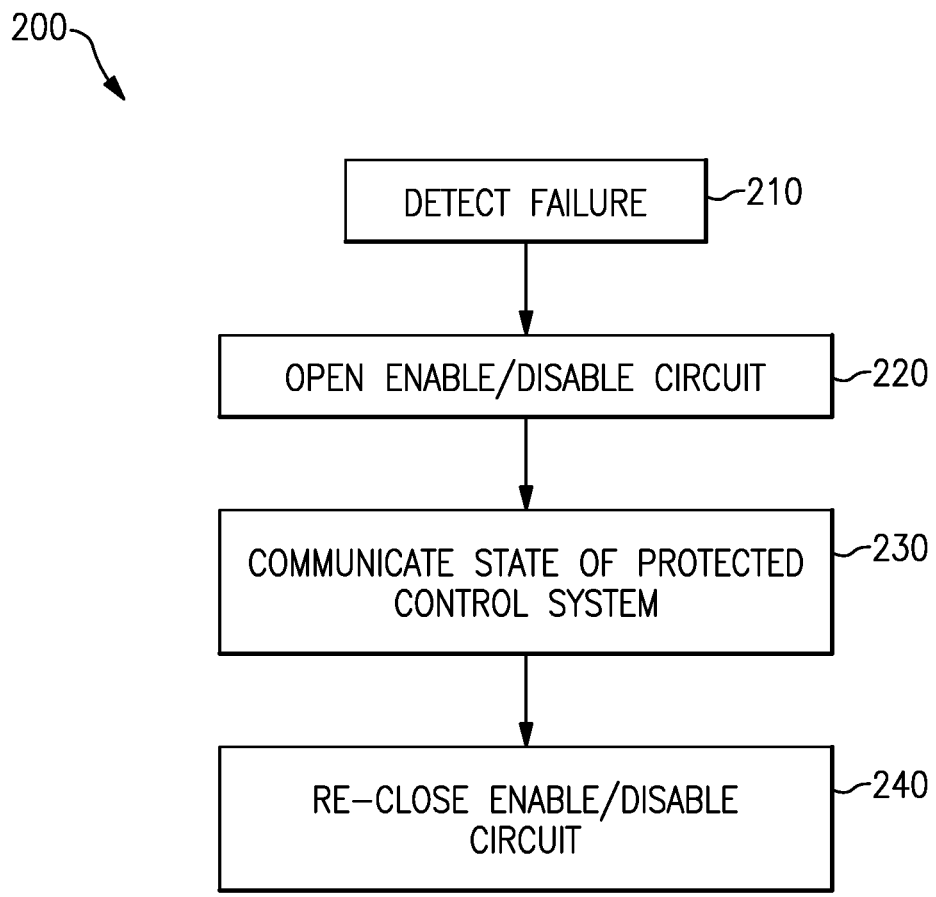
FIG. 4 illustrates a flowchart of operations of the enable/disable circuit in the exemplary lightning protection circuit of FIG. 2.

With continued reference to FIG. 3, FIG. 4 is a flowchart 200 illustrating a process by which the circuit 100 of FIG. 3 can communicate a failure of the transient voltage protection device with the lightning protection device 110 to a cockpit 140. Initially, the protected control system 120 detects a failure of the lightning protection device 110, using any known self-test system or configuration in a "detect failure" step 210.

Once a failure of the lightning protection device 110 has been detected the protected control system outputs a control signal to the enable/disable circuit 130 causing the open/closed state of the enable/disable circuit to be switched to an open state in an "Open Enable/Disable Circuit" step 220. By opening the enable/disable circuit 130, the short circuit pathway to the neutral 104 through the lightning protection device 110 is removed, and communications across the single line communication bus 102 can proceed in a "Communicate State of Protected Control System" step 230.

In order to prevent potential damage from operating an unprotected single line communication bus 102, once the state of the protected control system 120 has been communicated, the protected control system 120 re-closes the enable/disable circuit 130 returning the single line communication bus 102 to a shorted state in a "Re-Close Enable/Disable Circuit" step 240. In some examples an in-flight control system is configured to determine whether lightning protection is required on an ongoing basis. In such examples, the step of re-closing the enable/disable circuit 130 can be omitted when no ongoing lightning protection is necessary.

By electrically removing the short circuit for a brief period, the single line communication bus 102 is able to communicate the status of the protected control system 120, as well as the status of any other devices connected to the single line communication bus 102 to the cockpit 140. In this way, the pilot can be informed as to whether the protected control system 120, and other devices that communicate via the single line communication bus 102, are functional and can decide on an appropriate course of action in response.

Figure 5:
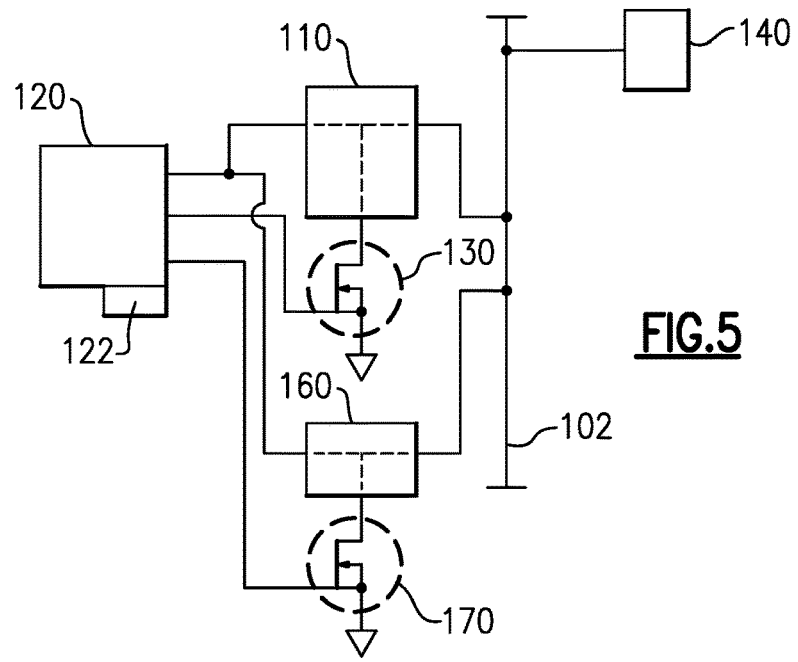
FIG. 5 schematically illustrates the lightning protection circuit of FIG. 2, with the addition of an optional secondary feature.

With continued reference to FIG. 3, FIG. 5 schematically illustrates the lightning protection configuration of FIG. 2, with the addition of an optional secondary lightning protection device 160, and a corresponding secondary enable/disable circuit 170. The secondary lightning protection circuit 160 and the secondary enable/disable circuit 170 are redundant components with the primary lightning protection device 110 and the primary enable/disable circuit 130, with the exception that the secondary enable/disable circuit 170 is normally open, instead of normally closed.

In the event of a failure of the primary lightning protection device 110 in an open state, the primary enable/disable circuit 130 disables the primary lightning protection device 110 as described above with regards to FIGS. 3 and 4. At the same time, the protected control system 120 enables the secondary lightning protection circuit 160 by switching the secondary enable/disable circuit 170 to closed. Once the swap has been achieved, the secondary lightning protection circuit is maintained in its enabled state and the communication across the single line communication bus can be maintained beyond the brief time period required to communicate the state of the protected control system 120.

Due to the opposite normal states of the enable/disable circuits 130, 170, in some examples, the control signal output from the protected control system 120 can be a single output control signal that is inverted at one of the enable/disable circuits 170. Alternatively, in examples such as the illustrated example of FIG. 5, each enable/disable circuit 130, 170 can have a dedicated control signal from the protected control system 120.

In further examples, the redundant configuration of FIG. 5 can be expanded to include any number of additional secondary lightning protection devices and secondary enable/disable circuits with minimal modification to the illustrated design.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An aircraft electrical system comprising:
   a controller system including a self-testing system configured to test an operability of a transient voltage suppression device;
   a single line communication bus connected to a communications output of said controller;
   a first lightning protection device including the transient voltage suppression device and configured to protect the controller from transient voltages; and
   an enable/disable circuit comprising a normally closed switch connecting a low side of the lightning protection device to a neutral, wherein the enable/disable circuit includes a control input connected to the controller system.

2. The aircraft electrical system of claim 1, wherein the controller further includes a memory configured to cause the enable/disable circuit to disable switch the normally closed switch to an open position for a predetermined time period in response to the self-testing system determining that short circuit failure of the transient voltage suppression device.

3. The aircraft electrical system of claim 1, further comprising at least a secondary lightning protection circuit.

4. The aircraft electrical system of claim 3, further comprising a secondary enable/disable circuit having a normally open switch connecting a low side of the secondary lightning protection circuit to the neutral.

5. The aircraft electrical system of claim 3, wherein said controller system is connected to an input of the normally closed switch and an inverted input of the normally open switch via a single controller output.

6. The aircraft electrical system of claim 3, wherein said controller system is connected to an input of the normally closed switch via a first control output and is connected to an input of the normally open switch via a second control output.

7. The aircraft electrical system of claim 1, wherein the normally closed switch is a MOSFET transistor.

8. The aircraft electrical system of claim 1, wherein the controller system is the sole device configured to communicate over the single line communication bus.

9. The aircraft electrical system of claim 1, further comprising at least one secondary controller system having a communication output connected to the single line communication bus.

10. A method for operating an aircraft lightning protection circuit comprising:
    detecting a transient voltage suppression device failure using a controller system self-testing circuit;
    disconnecting the transient voltage suppression device using an enable/disable circuit, wherein an open/closed state of the enable/disable circuit is controlled by the controller system; and
    communicating a state of at least one protected control system over a connected single line communication bus during a preset duration.

11. The method of claim 10, wherein disconnecting the transient voltage suppression device using an enable/disable circuit comprises switching open a normally closed switch connecting a low side of a lightning protection device to a neutral.

12. The method of claim 11, wherein disconnecting the transient voltage suppression device using an enable/disable circuit further comprises switching closed a normally open switch connecting a low side of a secondary lightning protection device to a neutral.

13. The method of claim 12, wherein disconnecting the transient voltage suppression device using an enable/disable circuit further comprises outputting a single switch control signal from said controller.

14. The method of claim 12, wherein disconnecting the transient voltage suppression device using an enable/disable circuit further comprises outputting a first switch control signal to a control input of the normally closed switch and a second control signal to a control input of the normally open switch.

15. The method of claim 10, wherein communicating a state of at least one protected control system over the connected single line communication bus comprises communicating a detected short circuit failure of the transient voltage suppression device.

16. The method of claim 10, wherein disconnecting the transient voltage suppression device using the enable/disable circuit comprises disconnecting the transient voltage suppression device for the preset duration.

* * * * *